Aug. 30, 1938.    R. T. KILLMAN ET AL    2,128,365
LENS
Filed Oct. 24, 1936
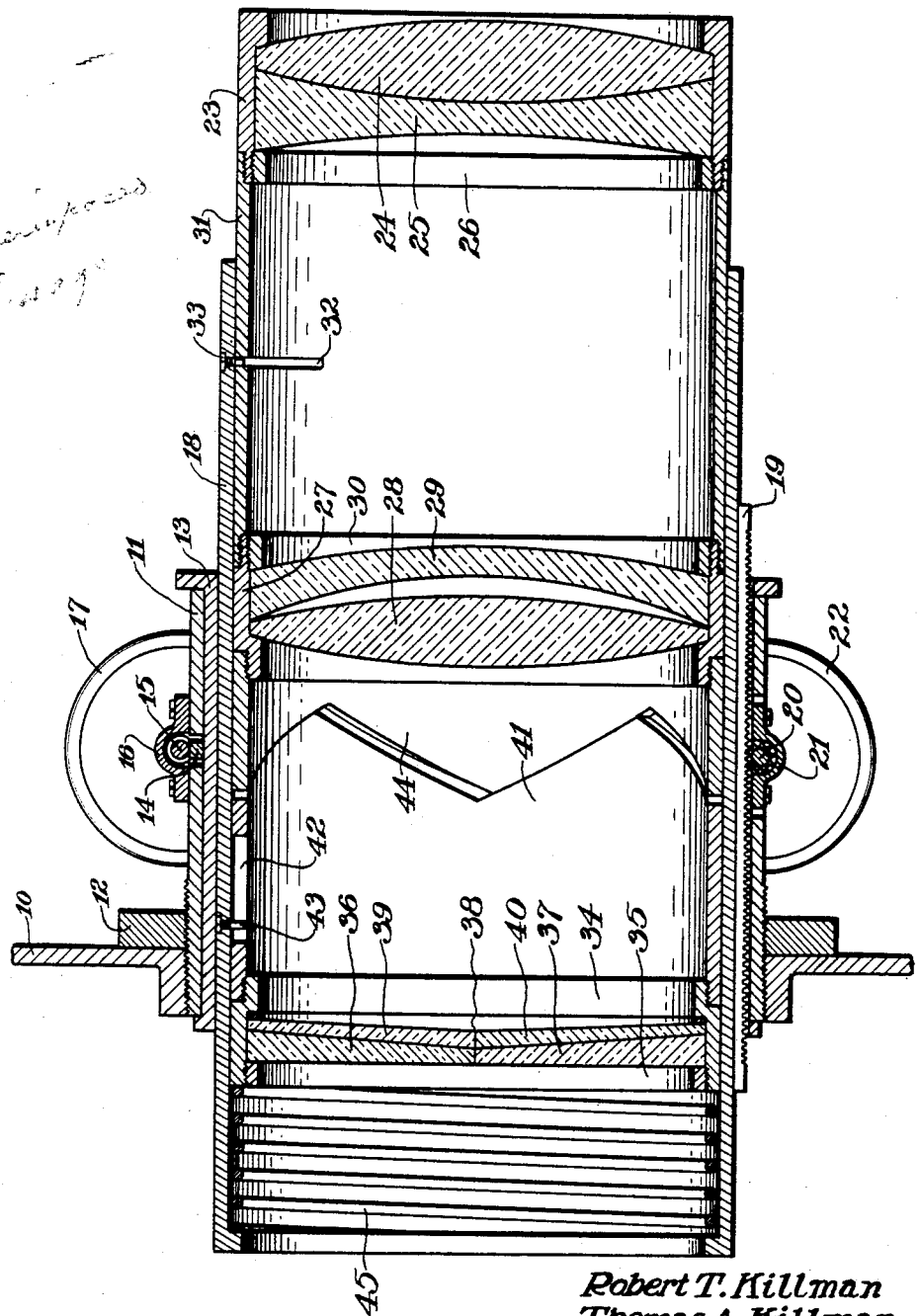
Robert T. Killman
Thomas A. Killman
INVENTORS
BY Robert T. Killman
ATTORNEYS.

Patented Aug. 30, 1938

2,128,365

UNITED STATES PATENT OFFICE 2,128,365

LENS

Robert T. Killman and Thomas A. Killman, Nashville, Tenn.

Application October 24, 1936, Serial No. 107,324

3 Claims. (Cl. 88—57)

This invention relates to a lens system for use with motion picture projectors and particularly with projectors for projecting motion pictures in natural colors by the additive process, wherein adjacent frames of a film carrying a number of pairs of complementary color records are projected in superimposition upon the viewing screen. Such a projector is shown and described in our patent dated Nov. 10, 1936, No. 2,060,503.

The projector shown and described in the above mentioned patent was equipped with a double lens system whereby the adjacent frames were projected to the viewing screen each by a separate lens, the relative position of which with respect to the other was such that the two images thus projected upon the screen were superimposed, one upon the other in perfect registry.

In practice, it has been found that in order to cause said images to superimpose upon the screen in perfect registry under all conditions of varying throw, varying angle of projection, etc., it is necessary that the lens system be capable of being adjusted in three separate ways. These are: first, the lens system must be capable of being adjusted so as to focus each frame upon the screen, second, it must be capable of being adjusted so as to shift the two images upon the screen horizontally with respect to each other, and third, it must be capable of being adjusted so as to shift the images upon the screen vertically with respect to each other.

The present invention discloses a structure wherein one lens system and a double prism system is substituted for the double lens system shown and described in the above mentioned patent, and wherein all of the above mentioned adjustments are provided for in a simple and practical manner.

It is among the objects of the present invention to provide within a single tubular lens casing means whereby two adjacent frames of a film may be projected superimposed in perfect registry upon a screen.

Another object of this invention is to provide in a lens system of this type means whereby the two projected images may be focused and their relative positions shifted either vertically or horizontally.

Another object of this invention is to provide in a single projection lens tube means for supporting between the lens system and the film a system of semicircular prism segments, and the provision of novel means whereby the positions of the lens segments and of the lens system may be adjusted relative to each other and to the film.

Another object of this invention is to provide means whereby the projected images may first be brought to a focus upon the screen surface and then superimposed one upon the other in perfect register, said operation of registering in no way affecting the previous perfection of focus.

Another object of this invention is to provide in such a lens and prism system means whereby the relative position of lens and prisms, once set properly for any given set of conditions will not be changed due to subsequent focusing of the lens system to compensate for changes in the length of throw, it having been determined by experiment that the change in relative position of lens and prisms to compensate for a change in the length of throw is very much smaller than the change in position of the lens relative to the film to re-focus the images after a change in throw. In other words the focusing adjustment moves the lens and prisms as a unit without disturbing their relative positions.

Another object of this invention is the provision of a projection lens system of the character described which is interchangeable mechanically and physically with the standard projection lenses now in use, and which is capable of being substituted therefor upon standard projection machines without requiring any change to be made in said machines, other than unscrewing and removing the standard lens and replacing it with the lens of this invention.

The method by which these, and other objects which will be apparent later, is accomplished is best understood by reference to the following description and the accompanying drawing which shows a sectional view of the lens assembly of our invention in place upon a standard projection machine, a portion only of the lens plate of said machine being shown.

The single figure is a sectional view of an objective incorporating the preferred embodiment of the device.

Referring now to the drawing the numeral 10 designates a portion of the standard lens plate of a projection machine. Lens plate 10 is provided with an integral threaded extension adapted to receive the threaded portion of standard lens tubes. Our invention provides a threaded sleeve 11 adapted to threadedly engage said threaded extension and a locknut 12 by which sleeve 11 may be locked in position within said threaded extension. Fitting within sleeve 11 and rotatable therein is a second sleeve 13 having integral end collars whereby relative end movement of sleeves 11 and 13 is prevented. An arcuate rack member 14 having worm gear teeth formed thereon is affixed to the sleeve 13 and projects through a suitable slot in sleeve 11 to coact with a worm 15 supported in a bearing member 16 mounted on sleeve 11 in such manner that when worm 15 is turned by means of thumb wheel 17, sleeve 13, will be caused to rotate within sleeve 11.

Slidably mounted within sleeve 13 is a third sleeve 18, having mounted lengthwise thereon the rack 19 which extends through a slot in sleeve 13, thereby preventing rotation of sleeve 18 within sleeve 13, and coacts with a pinion 20 supported in a bearing member 21 mounted upon sleeve 13, a suitable opening being formed therefor in sleeve 11. This opening is made sufficiently large to allow space around bearing member 21 for a limited rotation of sleeve 13 within sleeve 11. A rotation of pinion 20 by means of thumb wheel 22 causes sleeve 18 to be moved longitudinally within in sleeve 13.

Located within sleeve 18 is the lens assembly comprising the front lens ring 23, in which the glass lens elements 24 and 25 are secured by the threaded retaining ring 26, and which is joined to the back lens ring 27, in which the glass lens elements 28 and 29 are secured by retaining ring 30, by the sleeve 31 provided with the slot 32, which cooperates with the small screw 33 in sleeve 18 to allow limited rotation of the lens assembly relative to sleeve 18 but prevents relative end movement thereof.

Also located within sleeve 18 is the prism assembly comprising the prism ring 34 in which the prism system is secured by the retaining ring 35. The prism system comprises the two principal semicircular prisms 36 and 37 with their thin edges meeting on a diameter 38 and two auxiliary prisms 39 and 40 for the purpose of correcting chromatic aberration. The composite prisms 36—39 and 37—40 are arranged to bend light rays away from their intersection 38.

Attached to the prism ring 34 is the sleeve 41, provided with the lengthwise slot 42 with which a small screw 43, located in sleeve 18 coacts to allow lengthwise motion of the prism assembly relative to sleeve 18 but preventing rotary relative motion thereof. Formed on the free end of sleeve 41 are serrations or cams having inclined edges which cooperate with similar serrations formed on the end of a similar sleeve 44 threadedly engaging the back lens ring 27 and act as cams in such manner that a rotary motion of the lens assembly will cause a lengthwise motion of the prism assembly within sleeve 18 against the influence of a coiled spring 45, one end of which bears against the prism assembly and the other end bears against a constriction in the end of sleeve 18. In this manner the position of the prism assembly relative to the film and to the lens assembly may be changed or adjusted.

The composite prism 36—39 is used to project one of the pictures presented at the film gate while the composite prism 37—40 is used to project the other of said pictures. The angle of deflection of the prisms is made such that under normal conditions the two images are approximately superimposed. Under these circumstances, due to the fact that the light passing through the film is diverging small adjustments of the relative vertical positions of the two images upon the screen may be made by changing the longitudinal position of the prisms relative to the film and the lens. This is the purpose of the motion described above as produced by the serrated sleeves 41 and 44 when the lens assembly is rotated. Lateral adjustments of the images may be made by rotating the prism system about the longitudinal axis perpendicular to the film. In the present invention this is accomplished by rotating thumb wheel 17 which causes sleeve 13 to rotate within sleeve 11 carrying the prism assembly with it.

The operation of installing and adjusting the lens of our invention upon a standard projecting machine is as follows:

Having first removed the standard lens from the lens plate 10 the sleeve 11 is engaged with the threaded lens opening and screwed thereinto, the locknut 12 being used to lock the sleeve in such position that the images are approximately laterally registered (or the meeting edges of the prisms are approximately level). By means of thumb wheel 22 the images are brought into focus. Then by means of thumb wheel 17 the images are brought into lateral registration and finally by rotating the lens assembly (by means of the front lens ring 23 and the projecting portion of sleeve 31) the prism assembly is moved back and forth within sleeve 18 until vertical registration is secured.

While the form of embodiment of the present invention as herein disclosed constitutes a preferred form, it is to be understood that other forms might be adopted, all coming within the scope of the claims which follow.

What is claimed is as follows:

1. In a projection lens system for use with motion picture projecting machines the combination of a stationary sleeve adapted to be rigidly attached to the projecting machine; a sleeve rotatable within said stationary sleeve; worm gear means carried by said stationary sleeve whereby rotation of said rotatable sleeve within said stationary sleeve may be manually effected; a sleeve longitudinally slidable within said rotatable sleeve; rack and pinion means carried by said rotatable sleeve whereby longitudinal motion of said slidable sleeve within said rotatable sleeve may be manually effected; a lens assembly rotatably mounted within said longitudinally slidable sleeve; means preventing longitudinal motion of the lens assembly relative to said sleeve, but at the same time permitting a limited rotation of the lens assembly relative to said sleeve; a prism assembly slidably mounted within said longitudinally slidable sleeve; means preventing rotation of the prism assembly relative to said sleeve, but at the same time allowing limited longitudinal motion of the prism assembly relative to said sleeve; serrated, cam members carried, one upon the prism assembly and one upon the lens assembly and coacting one with the other whereby a rotation of the lens assembly relative to said longitudinally slidable sleeve causes a longitudinal motion of the prism assembly relative to said sleeve; and resilient means urging the cam members into contact.

2. In a lens system, a sleeve, a lens assembly rotatably mounted within said sleeve, means preventing longitudinal motion of the lens assembly in said sleeve, a prism assembly mounted for longitudinal motion in said sleeve, means preventing rotation of the prism assembly in said sleeve, serrated cam members carried, one upon the prism assembly and one upon the lens assembly, and coacting one with the other whereby rotation of the lens assembly relative to the prism assembly causes longitudinal motion of the prism assembly relative to the lens assembly.

3. In a lens system, a sleeve, a lens assembly mounted for rotation therein, a prism assembly mounted for longitudinal sliding movement in said sleeve and spaced therein from said lens assembly, a tubular serrated cam member carried upon the end of the lens assembly nearest the prism assembly, a complementary tubular serrated cam member carried upon the end of the prism assembly nearest the lens assembly, the teeth of said cam members being mutually intermeshed whereby a rotation of the lens assembly relative to the prism assembly causes longitudinal movement of the prism assembly relative to the lens assembly.

ROBERT T. KILLMAN.
THOMAS A. KILLMAN.